United States Patent
Grosset et al.

(10) Patent No.: US 8,540,813 B2
(45) Date of Patent: Sep. 24, 2013

(54) INTAGLIO PRINTING INK COMPRISING DENDRIMERS

(75) Inventors: Anne Grosset, La Croix-de-Rozon (CH); Olivier Lefèbvre, Lausanne (CH); Christophe Schaller, Ollon (CH); Nicolas Trachsel, Bex (CH); Patrick Magnin, Maxilly (FR); Patrick Veya, Bremblens (CH)

(73) Assignee: Sicpa Holding SA, Prilly (CH)

( * ) Notice: Subject to any disclaimer, the term of this patent is extended or adjusted under 35 U.S.C. 154(b) by 254 days.

(21) Appl. No.: 13/000,883

(22) PCT Filed: Jun. 23, 2009

(86) PCT No.: PCT/EP2009/057819
§ 371 (c)(1),
(2), (4) Date: Dec. 22, 2010

(87) PCT Pub. No.: WO2009/156400
PCT Pub. Date: Dec. 30, 2009

(65) Prior Publication Data
US 2011/0109076 A1    May 12, 2011

(51) Int. Cl.
C09D 11/10    (2006.01)
B41M 1/10    (2006.01)
C08G 63/48    (2006.01)
B42D 15/10    (2006.01)

(52) U.S. Cl.
USPC ........... 106/31.61; 522/183; 524/599; 283/57

(58) Field of Classification Search
USPC ........ 106/31.61; 522/183; 524/599; 283/57
See application file for complete search history.

(56) References Cited

U.S. PATENT DOCUMENTS

| 3,345,313 | A | 10/1967 | Ruhf et al. |
| 3,669,939 | A | 6/1972 | Baker et al. |
| 4,912,187 | A | 3/1990 | Eckler |
| 5,136,014 | A * | 8/1992 | Figuly .......................... 528/272 |
| 5,319,052 | A | 6/1994 | Prantl et al. .................... 524/474 |
| 5,389,130 | A * | 2/1995 | Batlaw et al. ............... 106/31.26 |
| 6,063,841 | A | 5/2000 | Link et al. |
| 6,096,801 | A | 8/2000 | Vincent et al. |
| 6,518,370 | B2 * | 2/2003 | Abuelyaman et al. ......... 525/437 |
| 6,787,583 | B2 | 9/2004 | Veya et al. .................... 438/231 |
| 6,806,301 | B2 * | 10/2004 | Latunski et al. ............... 523/160 |

(Continued)

FOREIGN PATENT DOCUMENTS

AU    2009264338    12/2009
DE    42 36 697    5/1994

(Continued)

OTHER PUBLICATIONS

Handbook of Print Media, p. 134, no date available.*

(Continued)

*Primary Examiner* — Helene Klemanski
(74) *Attorney, Agent, or Firm* — Greenblum & Bernstein, P.L.C.

(57) ABSTRACT

An ink for the engraved copperplate intaglio printing inks is disclosed, which comprises high-molecular-weight dendritic polymer as a binder component. Inks comprising such polymer can be formulated so as to contain a significantly reduced amount of organic solvent (volatile organic components, VOC) while still being in the appropriate viscosity range required by the intaglio printing process. The printed and cured intaglio ink of the present invention has improved chemical and mechanical resistance properties.

23 Claims, 2 Drawing Sheets

(56) References Cited

U.S. PATENT DOCUMENTS

Figure 1:
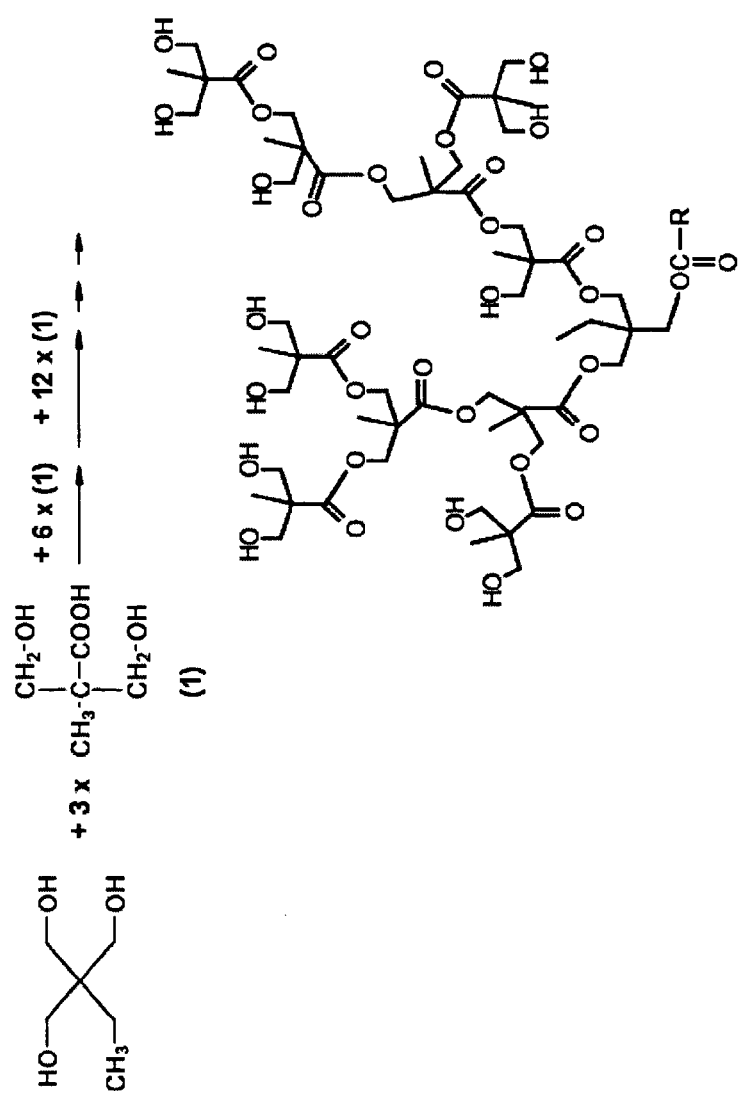

| | | | |
|---|---|---|---|
| 2003/0092797 A1* | 5/2003 | Wang et al. | 523/161 |
| 2004/0024087 A1 | 2/2004 | Bruchmann et al. | |
| 2004/0029989 A1 | 2/2004 | Veya et al. | 522/49 |
| 2004/0097684 A1 | 5/2004 | Bruchmann et al. | |
| 2005/0070628 A1 | 3/2005 | Menoud et al. | 523/160 |
| 2005/0147834 A1* | 7/2005 | Bruchmann et al. | 428/458 |
| 2007/0179211 A1* | 8/2007 | Leonard et al. | 522/71 |
| 2007/0266869 A1* | 11/2007 | Leonard et al. | 106/31.13 |
| 2009/0297796 A1 | 12/2009 | Menoud et al. | 428/195.1 |
| 2010/0162909 A1* | 7/2010 | Lefebvre et al. | 101/170 |
| 2010/0181753 A1* | 7/2010 | Magnin et al. | 283/71 |

FOREIGN PATENT DOCUMENTS

| | | |
|---|---|---|
| EP | 0 340 163 | 12/1992 |
| EP | 0 630 389 | 4/1998 |
| EP | 1260563 | 7/2006 |
| EP | 1 790 701 | 1/2009 |
| EP | 2 014 729 | 1/2009 |
| EP | 1 857 512 | 7/2009 |
| EP | 2 297 256 | 3/2011 |
| FR | 1418073 | 11/1965 |
| RU | 2002774 | 11/1993 |
| RU | 2288244 | 11/2006 |
| RU | 2296144 | 3/2007 |
| WO | WO-93/17060 | 9/1993 |
| WO | WO-96/13558 | 5/1996 |
| WO | WO-99/00439 | 1/1999 |
| WO | WO-99/00440 | 1/1999 |
| WO | WO-00/37542 | 6/2000 |
| WO | WO-00/64975 | 11/2000 |
| WO | WO-02/066541 | 8/2002 |
| WO | 03/020835 | 3/2003 |
| WO | WO-2004/037928 | 5/2004 |
| WO | WO-2005/047396 | 5/2005 |
| WO | WO-2005/092995 | 10/2005 |
| WO | WO-2009/156400 | 12/2009 |

OTHER PUBLICATIONS

European Search Report and Search Opinion for EPO Pat. Appln. No. 07112020.8, dated Oct. 4, 2007, 3 pp.

International Search Report for Intl. Pat. Appln. No. PCT/EP2009/057819, mailed on Sep. 25, 2009, 5 pp.

Preliminary Report on Patentability/Written Opinion of the International Searching Authority for Intl. Pat. Appln. No. PCT/EP2009/057819, mailed on Jan. 13, 2011, 7 pp.

Eurasian Patent Search Report that issued with respect to Eurasian Patent Application No. 201170068, mailing date Jun. 7, 2011.

* cited by examiner

INTAGLIO PRINTING INK COMPRISING DENDRIMERS

RELATED APPLICATIONS

This is the U.S. National Stage of PCT International Application Number PCT/EP2009/057819, filed Jun. 23, 2009, which claims priority to PCT International Application Number PCT/IB2008/001635, filed Jun. 23, 2008. The contents of the foregoing are incorporated herein by reference in their entirety.

FIELD OF THE INVENTION

The present invention relates to printing inks, more precisely to engraved copperplate intaglio printing inks, comprising high-molecular-weight dendritic polymer as a binder component. Inks comprising such polymer can be formulated so as to contain a significantly reduced amount of organic solvent (volatile organic components, VOC) whilst still being in the appropriate viscosity range required by the printing process. The printed and cured intaglio ink of the present invention has improved chemical and mechanical resistance properties.

BACKGROUND OF THE INVENTION

Copperplate intaglio remains the basic printing process used for currency printing. As known to the skilled person, this printing process relies on greasy and pasty inks, having a viscosity in the range of 5 to 40 Pa·s at 40° C. and 1000 s$^{-1}$. Intaglio inks are printed as a rather thick layer, of typically 20 to 100 micrometers thickness, and must for this reason be enabled to "dry" or cure, i.e. to harden on the substrate, subsequent to the printing operation.

To achieve sufficient resistance of the printed good towards solvents, a "chemical drying", either by catalytic oxypolymerisation under the influence of air oxygen, or by energy-activated (UV, E-beam) polymerization of a binder component, is preferred over a mere "physical drying" by the evaporation of a volatile solvent from the ink. Most of the currently used oxypolymerisation drying intaglio inks contain nevertheless a significant amount of volatile organic solvent, which serves to adjust the ink's viscosity, so as to fit requirements imposed by the printing process. Volatile organic components (VOC) are, on the other hand, subject to environmental regulations, and the ink formulator tends in consequence to keep the use of such substances as low as possible.

The increasing sensitivity of the public to environmental concerns, as well as the necessary responsiveness of the chemical industry to environmental regulations such as REACH and GHS, have resulted in new formulation requirements for intaglio inks. Intaglio paste inks having a low volatile organic content can be marketed as "low VOC" inks; "low VOC" being a desirable label from the environmental point of view, and every reduction in VOC represents a further market advantage for the ink.

There is thus a need for still further reducing, if not even eliminating the volatile organic contents in intaglio printing inks.

SUMMARY OF THE INVENTION

The present invention, disclosing an improved intaglio ink composition according to the independent claims, addresses the problem of reducing the content of volatile organic components (VOC), such as organic solvents and diluents, while at the same time maintaining the desirable qualities of the ink, such as the printing performance, the water-wipeability, and the mechanical and chemical resistances of the resulting printed and dried ink film.

Inks for the engraved copperplate intaglio printing process have been described in EP 0 340 163 B1. This document already addresses the need to reduce the use of volatile organic components (VOC) in the inks and in the printing process, in order to cope with the increasingly important environment, health and safety regulations stipulated by national and international law. The inks according to EP 0 340 163 B1 comprise a hydrophilic binder, which enables the replacement of part of the solvent by water, thus reducing the VOC. The present invention discloses an alternative way to reach the same goal.

According to the present invention, the intaglio ink binder's viscosity is reduced by relying on dendritic polymers (dendrimers) as a mandatory component of the ink binder. Dendrimers are high molecular weight polymers, whose molecules have a compact, sphere like shape, rather than the form of an extended molecular chain. Such polymers have a low viscosity/molecular weight ratio, as known to the skilled person. Corresponding inks can be formulated without comprising significant amounts of solvents. After printing of the ink according to the present invention, the sphere-like molecular units can be crosslinked through a chemical drying mechanism, so as to form, in relatively few crosslinking steps, extended aggregates, hereby rapidly raising the viscosity of the printed ink to very high values without causing noticeable mechanical shrinking.

According to the present invention, the preferred ink binder comprises a part of chain-like molecules and a part of dendritic polymer (dendrimer). It was surprisingly found that such mixed-polymer binders show even better resistance performances in the printed ink than the standard binder comprising exclusively chain-like molecules.

In still another aspect, the present invention allows for the formulation of water-dispersible inks, which are suited for use on water-wipe Intaglio printing presses.

Such water-dispersible inks are obtained by using a binder comprising hydrophilic polymer components, i.e. polymers having a certain amount of polar chemical functionalities.

The invention comprises as well a method of producing the ink, the use of the ink for printing security document, and security documents carrying the ink.

DETAILED DESCRIPTION

The present invention aims at an intaglio ink composition having a reduced amount of organic solvents, whilst preserving or enhancing the ink's printing and drying performance, in particular the viscosity, as well as the mechanical and chemical resistances of the printed and dried ink film.

The viscosity of the binder (varnish) component is related, on the one hand, to the average molecular weight of the polymer—the higher its average molecular weight, the more viscous the polymer—and, on the other hand, to chemical and geometrical factors of the polymer molecules. The chemical factors comprise the functionalities which are present on or in the polymer chain; the presence of polar groups, such as carbonyl or carboxyl groups, as well as of hydrogen bonds, increases in general the viscosity of the polymer at a given molecular weight. The geometrical factors comprise the shape of the polymer molecules; at a given molecular weight, a sphere-like molecular shape results in a much lower viscosity than an elongated, chain-like molecular shape.

The knowledgeable person in the formulation of coating compositions is, on the one hand, aware of the fact that a binder of globular or spherical polymer molecules leads to a viscosity reduction; on the other hand, the viscosity is not the only factor to be considered in a coating composition which must also fulfill requirements such as the capability to form a resistant film. This is not always and necessarily the case with binders consisting of sphere-shaped or globular molecules.

In intaglio printing inks, the primary contribution to the volatile organic components (VOC) arises from the varnishes comprised in the binder; therefore, the reduction of volatile organic compounds in the ink principally requires a reduction or elimination of the volatile organic components (VOC) comprised in the ink binder. Lowering the binder polymer's molecular weight is not perceived as a preferred option, because this would increase the drying time of the resulting printing ink and adversely affect the resistance properties of the printed goods. Eliminating the binder polymer's polar and hydrogen-bonding chemical functionalities is not an option either, because these functionalities are needed to provide the required adhesion between the ink and the substrate.

A further requirement imposed on the ink stems from the water-wiping system of the intaglio printing process. During the printing operation, the rotating intaglio printing cylinder is sequentially inked by an inking system, wiped clean by a wiping cylinder, and brought in contact, under pressure, with a sheet-like substrate to be imprinted. The wiping cylinder, in turn, is constantly cleaned with a wiping solution comprising sodium hydroxide (NaOH) and sulphated castor oil as a detergent. This type of wiping system asks for a sufficiently hydrophilic ink, so as to allow its emulsifying with water under the influence of the detergent. From the environmental point of view, water-wiping inks need to be optimized so as to operate at lower concentrations of NaOH and sulphated castor oil, in order to reduce the amount of base and of organic content in the effluent waste water.

Thus, several a priori contradictory demands must be simultaneously served by the ink, in the light of both, the quality and durability of the resulting intaglio imprint, as well as the requirements of the environmental regulation.

When aiming at increasing the resistance of a printed ink film e.g. a dried intaglio imprint, the ink formulator generally uses a binder polymer of high molecular weight. However, increasing the molecular weight of the binder polymer leads to an increase of the ink's viscosity, rendering the ink's press performance unsuitable for a good printing quality. In such case it is necessary to add solvent, usually a high-boiling hydrocarbon solvent, in order to reduce the ink's viscosity to an appropriate level for the printing process.

We have found that the substitution of a part of the ink's binder polymer by a dendritic polymer (dendrimer) yields intaglio printing inks of lower viscosity, reducing in this way the amount of solvent needed to adjust the ink's viscosity to fit the printing requirements. It is then even possible to increase the average molecular weight of the binder polymers, and thus the resistance of the printed ink films, whilst still retaining a sufficiently low viscosity for running the printing operations, without the further addition of solvent.

In a further aspect, we also found that the partial or total replacement of organic solvent by low-viscosity dendrimer compounds acting as reactive diluents can result in a highly reticulated high molecular weight ink film, whilst maintaining an adequate viscosity of the ink in the printing process.

Polymers of sphere-like molecular shape are known in the art and also described as starburst- or star-polymers, or also as hyperbranched or dendritic (=tree) polymers, or dendrimers.

Dendrimers of various, different chemistries are known; in principle, all chemistries known in polymer science are applicable to dendrimers as well.

Self-condensation polymers of the polyester type, supposed to have a dendritic structure, have been disclosed in U.S. Pat. No. 3,669,939 (Baker et al.); they were derived from α-polyhydroxy-monocarboxylic acid monomers; in particular from 2,2-dimethylolpropionic acid (DMPA). An air-drying polyester formulation prepared from DMPA and linseed oil is also disclosed.

2,2-Dimethylolpropionic acid (DMPA) as an alkyd resin component has been disclosed in U.S. Pat. No. 3,345,313 (R. J. Ruhf et al.; Troyan Powder Co, PA), its industrial synthesis, disclosed in FR 1418073, is achieved by an exhaustive hydroxymethylation of propanal, followed by oxidation with hydrogen peroxide.

U.S. Pat. No. 4,912,187 (P. E. Eckler) discloses dendrimeric polyesters obtained by condensation of a sterically hindered polyhydroxy-monocarboxylic acid, such as dimethylolpropionic acid, with a polyhydroxyl compound as a nucleating molecule, such as pentaerythritol or trimethylolethane, as well as a rosin, alkyd, or polyester resin containing said dendrimeric polyester.

Dendrimers of the polyester type, which are suitable for application in coating compositions, were disclosed in WO 93/17060 A1 and EP 0 630 389 B1 (Hult et al., Perstorp AB). These compounds are obtained by the controlled esterification (FIG. 1) of a polyhydroxy compound (such as trimethylolpropane, pentaerithritol, etc.) serving as a central nucleating molecule, with an appropriate number of equivalents of dimethylolpropionic acid, in one or several subsequent steps. The resulting polyols can then be further functionalized by modification of the resulting, terminal hydroxyl groups with appropriate side chains (e.g. esterification with saturated carboxylic acids, alkyd residues, acrylic acid, vinyl ethers, or residues containing functionalities such as epoxides, oxetanes, aziridines, isocyanides, carbodiimides, etc.). WO 96/13558 A1 discloses unsaturated binder compositions for oxidatively drying coatings and adhesives, based on the dendrimers of WO 93/17060 A1.

The disclosed dendritic polyols are industrially produced (WO 99/00439 A1; WO 99/00440 A1), as well as some of their functionalized derivatives (WO 00/64975 A1: acrylate-terminated polyester; WO 02/066541 A1: carboxy-terminated polyester), and corresponding air-drying (WO 04/037928 A1: alkydes) and radiation-curable (WO 05/047396 A1: acrylates) waterborne coating compositions have also been disclosed.

The intaglio ink of the present invention, comprises thus a dendritic polymer (dendrimer) as a mandatory binder component. The dendritic polymer is preferably a derivative of a hyperbranched polyester, preferably derived from 2,2-dimethylolpropionic acid. The polyester may be the basic, polyhydroxyl-functionalized hyperbranched polyester. The polyester may also be functionalized on part or on all of its hydroxyl groups. Particularly interesting functional groups in this context are the saturated carboxylic acids, the unsaturated carboxylic acids, as well as the cross-linking functionalities provided by acrylic residues, the epoxides, the oxetanes, the aziridines, the isocyanides, the carbodiimides, and others of the like. The ink according to the present invention may further comprise two or more hyperbranched polyesters having different functional groups, e.g. a basic poly-hydroxyl dendrimer, a poly-hydroxyl dendrimer modified with saturated carboxylic acid residues, and a poly-hydroxyl dendrimer modified with unsaturated (drying) carboxylic acid residues.

In a first embodiment, the Intaglio printing ink according to the present invention comprises a binder, pigment, filler and optionally organic solvent, has a viscosity in the range of 3 to 60 Pa·s at 40° C., and is characterized in that the binder comprises at least one dendritic polymer.

In a particular embodiment, at least one dendritic polymer is chosen from the group of the derivatives of the hydroxyl-functionalized hyperbranched polyesters, preferably derived from 2,2-dimethylolpropionic acid. The preferred derivative of hydroxyl-functionalized hyperbranched polyesters has a molecular weight in the range between 1,000 and 10,000 g/mol, preferably in the range between 2,500 and 5,000 g/mol, and is present in an amount ranging from 1% to 50% by weight.

Preferred hyperbranched derivatives are the reaction products of the hydroxyl-functionalized dendritic polyester with carboxylic mono-, di-, and polyacids, with carboxylic anhydrides, with mono-, di-, and poly-isocyanides, epoxides, oxetanes, optionally in combination with other mono-alcohols, poly-alcohols, particularly mono-glycols and poly-glycols, with mono-amines, poly-amines, as well as with their derivatives.

In a further particular embodiment, at least one dendritic polymer is chosen from the group of the unsaturated fatty acid modified hydroxyl-functionalized hyper-branched polyesters, preferably derived from 2,2-dimethylolpropionic acid. The preferred unsaturated fatty acid modified hydroxyl-functionalized hyperbranched polyester has a molecular weight in the range between 2,500 and 10,000 g/mol, and is present in an amount ranging from 1% to 50% by weight.

The ink may further comprise at least one dendritic polymer chosen from the group of the saturated fatty acid modified hydroxyl-functionalized hyperbranched polyesters, preferably derived from 2,2-dimethylolpropionic acid. The preferred saturated fatty acid modified hydroxyl-functionalized hyperbranched polyester has a molecular weight in the range between 1,000 and 10,000 g/mol, preferably in the range between 2,500 and 5,000 g/mol, and is present in an amount ranging from 1% to 10% by weight.

The dendritic moiety can also be introduced by baking a fatty acid esterified dendritic polyol with a phenolic resin or a phenolic modified rosin ester.

For application in energy-curable compositions, the hydroxyl-functionalized dendritic polyester can be grafted with reactive chemical (cross-linkable) functionality selected from the group consisting of the acrylates, the vinyl ethers, the epoxides, the oxetanes, the aziridines, the isocyanides, and the carbodiimides.

The ink may thus further comprise at least one dendritic polyester grafted with reactive chemical functionality conferring it energy-curable properties. Preferably the reactive functionality grafted hydroxyl-functionalized hyperbranched polyester has a molecular weight in the range between 1,000 and 10,000 g/mol, preferably in the range between 2,500 and 5,000 g/mol, and is present in an amount ranging from 1% to 10% by weight.

The ink may further comprise a photoinitiator, which serves, in conjunction with appropriate reactive groups (acrylates, methacrylates, vinyl ethers, epoxides) grafted onto the dendritic polyester, to photochemically initiate the crosslinking ("curing") of the ink, in a way known to the skilled person.

The ink may also further comprise a siccativating agent, to initiate, in conjunction with air oxygen, an oxypolymerization reaction between appropriate reactive groups, such as unsaturated carboxylic acid residues ("alkyd resin" chemistry). The oxypolymerization catalyst may be the salt of a long-chain fatty acid with a polyvalent metal cation, such as cobalt (2+), vanadyl (2+), manganese (2+), or cerium (3+). Salts of the said type are oil soluble and thus compatible with fatty alkyd based inks The ink may further comprise soaps of calcium and/or zirconium and/or cerium as a co-siccativating agent to further improve the in-depth curing. Intaglio inks with non-cobalt drier systems are described in the pending application EP07112020.8 of the same applicant.

The intaglio printing ink of the present invention may further comprise at least one wax, such as Carnauba wax or polyethylene wax. The wax or blend of waxes are comprised in the intaglio printing ink of the present invention in amounts up to 10%, preferably up to 5% by weight of the total printing ink.

The intaglio printing ink composition may further comprise other components such as pigments for providing the color of the ink, fillers, emulsifiers, solvents, e.g. for the viscosity adjustment, as well as special additives and/or markers for security or forensic purposes.

The total amount of original poly-hydroxyl-dendrimer comprised in the intaglio printing ink of the present invention is up to 20%. The total amount of modified or functionalized poly-hydroxyl-dendrimer comprised in the intaglio printing ink of the present invention is up to 50%.

According to the said above, a series of different intaglio inks has been prepared and the properties of each ink have been verified. Hereafter we describe a heat-set intaglio ink comprising polyhydroxyl dendrimer, as well as two different, dendrimer containing oxidative curing intaglio inks for the water-wiping process, which demonstrate suitable rheology for good printing, as well as good resistances of the inks on the printed goods. A further example illustrates the use of dendrimer as a reactive diluent.

A first method for producing an ink according to the present invention comprises the step of adding at least one dendritic polymer is chosen from the group of the derivatives of hyperbranched polyesters, preferably derived from 2,2-dimethylolpropionic acid, to the ink.

Said derivative of hyperbranched polyesters preferably comprises a chemical functionality selected from the group consisting of the hydroxyls, acrylates, the vinyl ethers, the epoxides, the oxetanes, the aziridines, the isocyanides, and the carbodiimides.

Another method for producing an ink according to the present invention comprises the step of cooking a saturated fatty acid modified hydroxyl-functionalized hyperbranched polyester with a phenolic resin or a phenolic modified rosin ester.

The inks according to the present invention can be used for the printing of security documents, in particular of currency The present invention comprises as well a security document, in particular a banknote, carrying an ink according to what is disclosed herein.

The invention is now further illustrated with the help of the Figures and of exemplary embodiments:

FIGURES

FIG. 1 schematically illustrates the chemical formula and the construction principle of a dendritic poly-hydroxyl polymer core, such as is used in the context of the present invention.

Figure 2:
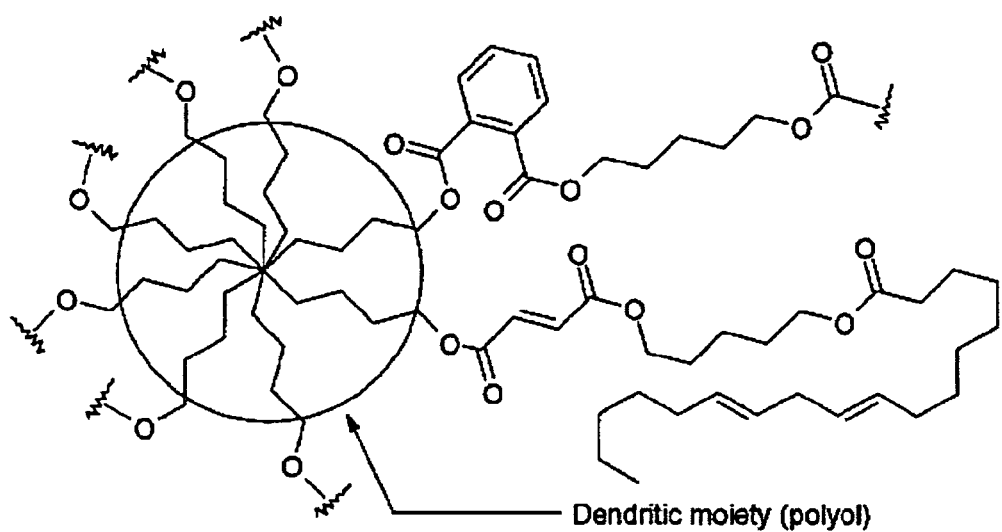

FIG. 2 schematically illustrates different possibilities of grafting chemical functionalities onto the dendritic polyhydroxyl polymer core.

EXAMPLES

Typical resins for embodying the ink of the present invention were chosen from the dendritic polyesters, marketed by Perstorp AB under the product name Boltorn®. These products are derived from polyalcohol cores and 2,2-dimethylolpropionic acid (Bis-MPA). The base products obtained are hydroxyl-functional dendritic polyesters.

Fully aliphatic, and comprising exclusively tertiary ester bonds, they provide excellent thermal and chemical resistance. Their extensive branching improves reactivity, lowers viscosity and results in balanced mechanical properties (reduced shrinking; isotropic behaviour). The different Boltorn® base products differ in molecular weight and numbers of terminal hydroxyl groups: H20 (16 OH; mw 1750); H2003 (12 OH, mw 2300); H2004 (6 OH, mw 3100); H30 (32 OH, mw 3600); H40 (64 OH, mw 7300). There are also functionalized Boltorn® resins available, e.g. P500 (acrylate modified, for radiation curing); U3000 (alkyd modified, for oxypolymerisation drying).

Other dendrimers have been tested with good results in other intaglio ink systems, as among these the Bomar Specialities Co. BDE series of oligomers of dendritic polyester acrylates.

The three examples following here below are intended to illustrate the impact of the dendritic moiety onto the amount of solvent required to reach an adequate viscosity for the printing process, and/or onto the improvement of the mechanical and chemical resistances of the dried ink layer.

General Procedures:

Inks have been prepared on a SDY300 three-roll mill in three passages (one at 8 bars and two at 16 bars).

The mechanical resistance values are based on a scale ranging from 1 to maximum 5. Values below 3 are not acceptable for a use on value documents and banknotes.

The viscosity has been measured on a Haake RotoVisco 1 rotational rheometer at 1000 s$^{-1}$ and 40° C.

Example 1

Heat-Set Intaglio Ink Comprising Dendrimers

Part 1. Preparation of the heat-set varnishes

The standard heat-set varnish consists of:

| | |
|---|---|
| 48 parts | rosin-modified phenolic high molecular weight resin |
| 8 parts | urethane-alkyd resin; dissolved in |
| 44 parts | mineral oil solvent. |

The dendritic heat-set varnish consists of:

| | |
|---|---|
| 5 parts | Boltorn H30 |
| 10 parts | Boltorn H2004 |
| 35 parts | rosin-modified phenolic high molecular weight resin |
| 9 parts | urethane-alkyd resin; dissolved in |
| 41 parts | mineral oil solvent. |

The raw materials used are as follows:

Rosin-modified phenolic high molecular weight resins

Arizona Chemical SYLVAPRINT MP 6364 rosin-modified phenolic high molecular weight resin;

Arizona Chemical SYLVAPRINT RL 43 rosin-modified phenolic high molecular weight resin; in a 1:1 ratio.

SICPA-specific urethane-alkyd resin:

Haltermann N-DODECANE mineral oil solvent.

Part 2. Formulation of the heat-set inks:

| Component | Standard ink (Type) | Dendritic polymer ink |
|---|---|---|
| Heat-set varnish (standard) | 26 | — |
| Heat-set varnish (comprising dendrimers) | — | 26 |
| Urethane-alkyd (1) | 7.5 | 7.5 |
| Long oil alkyd (2) | 1 | 1 |
| Medium oil alkyd (3) | 5 | 5 |
| Mineral oil solvent (4) | 6.5 | 2.16 |
| Fluorinated wax (5) | 2 | 2 |
| Polyethylene wax (6) | 5 | 5 |
| C.I. Pigment Blue 15:2 | 1.5 | 1.5 |
| C.I. Pigment Yellow 13 | 5.3 | 5.3 |
| C.I. Pigment Red 170 | 7 | 7 |
| Calcium carbonate | 30.5 | 30.5 |
| Talc | 2 | 2 |
| Driers (7) | 0.7 | 0.7 |
| Viscosity 40° C. 400 s$^{-1}$ (26-34*) | ~29 Pa · s | ~28 Pa · s |
| Percentage of solvent added to varnish plus percentage of solvent added to ink | 17.9% | 13.4% |

*normal values for heat-set ink

The total solvent added to the varnish and to the subsequent ink gives a difference of about 4 to 5% less solvent in the dendrimer ink.

The amount of solvent required to correct the viscosity during the preparation of the dendritic heatset intaglio ink is about ⅓ of the amount needed for the same operation during the preparation of the standard heat-set intaglio ink.

Part 3. Chemical and Mechanical resistances of the heat-set inks:

| Ink | Standard ink (Type) | Dendritic polymer ink |
|---|---|---|
| Laundry (machine 95° C.) | 3 | 3.5 |
| Dry crumpling 8× | 3.5 | 4 |
| Wet crumpling 4× | 4 | 4.5 |

The resistances of the heat-set intaglio ink prepared from the varnish comprising dendrimeric polyols are improved with respect to the standard ink.

Example 2

Water-Wiping Oxidative Intaglio Ink Comprising A Phenolic Resin Dendrimer Modified Varnish Part 1. Preparation of the water wiping oxidative phenolic resin based varnishes.

The standard water-wiping oxidative varnish was prepared as follows:

| | |
|---|---|
| 41 parts | phenolic modified rosin ester are cooked in |
| 41 parts | tung oil; and dissolved in |
| 18 parts | mineral oil. |

The Dendritic water-wiping oxidative varnish comprising dendrimers was prepared as follows:

| | |
|---|---|
| 40 parts | phenolic modified rosin ester are cooked in |

-continued

| Part 1. Preparation of the water wiping oxidative phenolic resin based varnishes. | |
|---|---|
| 40 parts | Boltorn U3000; and dissolved in |
| 20 parts | mineral oil. |

Part 2. Preparation of the water-wiping oxidative inks.
The inks are formulated as follows:

| Component | Standard ink (Type) | Dendritic polymer ink |
|---|---|---|
| Urethane-Alkyd (1) | 14 | 14 |
| Phenolic varnish (standard) | 6 | 0 |
| Phenolic varnish (comprising dendrimers) | 0 | 6 |
| Macromolecular surfactant (8) | 20 | 20 |
| C.I. Pigment Violet 23 | 2 | 2 |
| C.I. Pigment Blue 15:3 | 4 | 4 |
| Titanium dioxide | 2 | 2 |
| Fluorinated wax (5) | 1.5 | 1.5 |
| Carnauba wax | 5 | 5 |
| Talc | 1.5 | 1.5 |
| Vegetable oil and fatty acid esters (9) | 2.5 | 2.5 |
| Mineral oil | 2 | 2 |
| Calcium carbonate | 37 | 37 |
| Driers (7) | 2.5 | 2.5 |
| Viscosity 40° C. 1000 s − 1 (6-10*) | 8.2 | 8.6 |

*Normal water-wiping oxidative inks viscosity range

Both inks have about 12% volatile organic compounds (mineral oil) but the ink containing the dendritic polymer shows much better chemical resistance.

Part 3. Chemical and Mechanical Resistances:

| Ink | Standard ink (Type) | Dendritic polymer ink |
|---|---|---|
| Laundry (machine 95° C.) | 2.5 | 4.0 |
| Dry crumpling 8× | 4.5 | 4.5 |
| Wet crumpling 4× | 4.5 | 5.0 |

The chemical and mechanical resistances of the dendrimer-containing water-wiping intaglio ink are better than those of the standard ink.

Example 3

Water-Wiping Oxidative Intaglio Ink Comprising a Free Dendritic Reactive Diluent Example 3 describes the use of an unsaturated fatty acid modified dendritic polyol (Boltorn U3000) as a reactive diluent.

Part 1. Preparation of the water-wiping intaglio inks
Water wiping intaglio inks are prepared as follows:

| Component | Standard ink (Type) | Dendritic polymer ink |
|---|---|---|
| Urethane Alkyd (1) | 14 | 14 |
| Phenolic resin (10) | 6 | 6 |
| Macromolecular surfactant (8) | 20 | 20 |
| C.I. Pigment Violet 23 | 2 | 2 |
| C.I. Pigment Blue 15:3 | 4 | 4 |
| Titanium dioxide | 2 | 2 |
| Fluorinated wax (5) | 2 | 2 |
| Carnauba wax | 5 | 5 |
| Talc | 1.5 | 1.5 |
| Vegetable oil and fatty acid esters (9) | 2.5 | 0 |
| Mineral oil | 3 | 1 |
| Boltorn U3000 | 0 | 4.5 |
| Calcium carbonate | 36.5 | 36.5 |
| Driers (7) | 2.5 | 2.5 |
| Viscosity 40° C. 1000 s − 1 (6-10*) | 7.7 | 8.6 |
| Percentage of solvent added to the ink | 12.4 | 10.4 |

*Normal water-wiping oxidative inks viscosity range

The intaglio ink comprising Boltorn U300 as a reactive diluent is a low-VOC ink having only 10.4% of volatile organic compounds, compared to the standard ink which has 12.4% of volatile organic compounds.

Part 2. Chemical and Mechanical resistances:

| Ink | Standard ink (Type) | Dendritic polymer ink |
|---|---|---|
| Laundry (machine 95° C.) | 2.5 | 3.5 |
| Dry crumpling 8× | 4.5 | 4.5 |
| Wet crumpling 4× | 4.5 | 4.5 |

This example illustrates the advantage linked with replacing mineral oil and/or vegetal oil solvents in a water-wiping intaglio ink by a dendritic reactive diluent: whilst retaining an adequate printing viscosity for a lower solvent content, the ink containing dendritic reactive diluent shows increased mechanical resistances.

Example 4

Heat-Set Ink Comprising Dendrimer Varnish and Dendrimer Diluent

Part 1. Preparation of the heat-set varnishes.

The standard heat-set varnish consists of:

| 48 parts | rosin-modified phenolic high molecular weight resin |
|---|---|
| 8 parts | urethane-alkyd resin; dissolved in |
| 44 parts | mineral oil solvent. |

The dendritic heat-set varnish consists of:

| 7 parts | Boltorn H30 |
|---|---|
| 14 parts | Boltorn H2004 |
| 35 parts | rosin-modified phenolic high molecular weight resin |
| 9 parts | urethane-alkyd resin; dissolved in |
| 35 parts | mineral oil solvent |

Part 2. Formulation of the heat-set inks:

| Component | Standard ink (Type) | Dendritic polymer ink |
|---|---|---|
| Heat-set varnish (type) | 26 | — |
| Heat-set varnish (comprising dendrimers) | — | 26 |
| Urethane-alkyd | 7.5 | 7.5 |
| Long oil alkyd | 1 | 1 |
| Medium oil alkyd | 5 | 5 |
| Mineral oil solvent | 6.5 | 0 |
| Boltorn U3000 | 0 | 17 |
| Fluorinated wax | 2 | 2 |
| Polyethylene wax | 5 | 5 |
| C.I. Pigment Blue 15:2 | 1.5 | 1.5 |
| C.I. Pigment Yellow 13 | 5.3 | 5.3 |
| C.I. Pigment Red 170 | 7 | 7 |
| Calcium carbonate | 30.5 | 30.5 |
| Talc | 2 | 2 |
| Driers | 0.7 | 0.7 |
| Boltorn U3000 for correction | 0 | 10.5 |
| Viscosity 40° C. 400 s$^{-1}$ (26-34*) | ~29 Pa·s | ~29 Pa·s |
| Percentage of solvent added to varnish plus percentage of solvent added to ink | 17.9% | 8.2% |

*Normal heatset ink viscosity range

For the dendritic ink, the contribution from the amount of solvent added to the varnish in addition to the solvent added to the ink, is about half of that of the standard ink. The concentration of dendritic polymer (dendrimer) in this ink is approximately 15%.

Part 3. Chemical and Mechanical resistances of the heat-set inks:

| Ink | Standard ink (Type) | Dendritic polymer ink |
|---|---|---|
| Laundry (machine 95° C.) | 3 | 4.5 |
| Dry crumpling 8× | 4 | 5 |
| Wet crumpling 4× | 3 | 5 |

The resistances of the heatset intaglio ink prepared from the varnish comprising dendritic polyols and containing a free dendritic diluent are considerably improved.

The skilled in the art will be able, based on the herein disclosed information, to derive additional embodiments of the present invention.

The invention claimed is:

1. Ink for the copperplate intaglio printing process, comprising a binder, pigment, filler and optionally solvent, the ink having a viscosity in the range of 3 to 60 Pa·s at 40° C., wherein the binder comprises at least one dendritic polymer selected from the group consisting of unsaturated fatty acid modified hydroxyl-functionalized hyperbranched polyesters and wherein the ink further comprises at least one wax or a blend of waxes.

2. Ink according to claim 1, wherein said unsaturated fatty acid modified hydroxyl-functionalized hyperbranched polyester has a molecular weight ranging from 2,500 to 10,000 g/mol.

3. Ink according to claim 1, wherein said unsaturated fatty acid modified hyperbranched polyester is present in an amount ranging from 1% to 50% by weight.

4. Ink according to claim 1, further comprising at least one dendritic polymer selected from the group consisting of saturated fatty acid modified hydroxyl-functionalized hyperbranched polyesters.

5. Ink according to claim 4, wherein said saturated fatty acid modified hydroxyl-functionalized hyperbranched polyester has a molecular weight ranging from 1,000 to 10,000 g/mol.

6. Ink according to claim 4, wherein said saturated fatty acid modified hydroxyl-functionalized hyperbranched polyester is present in an amount ranging from 1% to 10% by weight.

7. Ink according to claim 1, further comprising a siccativating agent for initiating drying by oxypolymerisation of the ink.

8. Ink according to claim 1, further comprising at least one dendritic polymer selected from the group consisting of derivatives of hydroxyl-functionalized hyperbranched polyesters, with energy-curable, reactive chemical functionality.

9. Ink according to claim 8, wherein the energy-curable, reactive chemical functionality comprises a chemical functionality selected from the group consisting of acrylates, methacrylates, vinyl ethers, epoxides, and oxetanes.

10. Ink according to claim 8, wherein the energy-curable hydroxyl-functionalized hyperbranched polyester has a molecular weight ranging from 1,000 to 10,000 g/mol.

11. Ink according to claim 8, wherein the energy-curable hydroxyl-functionalized hyperbranched polyester is present in an amount ranging from 1% to 10% by weight.

12. Ink according claim 8, further comprising a photoinitiator.

13. Ink according to claim 1 utilized in the printing of security documents.

14. A security document carrying the ink according to claim 1.

15. The ink of claim 1, wherein said unsaturated fatty acid modified hydroxyl-functionalized hyperbranched polyester is derived from 2,2-dimethylolpropionic acid.

16. The ink of claim 4, wherein the saturated fatty acid modified hydroxyl-functionalized hyperbranched polyester is derived from 2,2-dimethylolpropionic acid.

17. The ink of claim 8, wherein the hydroxyl-functionalized hyperbranched polyester is derived from 2,2-dimethylolpropionic acid.

18. The ink of claim 10, wherein the energy-curable hydroxyl-functionalized hyperbranched polyester has a molecular weight ranging from 2,500 to 5,000 g/mol.

19. Method for producing an ink according to claim 1, the method comprising
   adding to the ink at least one derivative of a dendritic polymer, selected from the group consisting of unsaturated fatty acid modified hydroxyl-functionalized hyperbranched polyesters; and
   adding to the ink at least one wax or a blend of waxes.

20. Method for producing an ink according to claim 1, the method comprising
   cooking a saturated fatty acid modified hydroxyl-functionalized hyperbranched polyester with a phenolic resin or a phenolic modified rosin ester; and
   adding the cooked saturated fatty acid modified hydroxyl-functionalized hyperbranched polyester with a phenolic resin or phenolic modified rosin ester to the ink.

21. Ink according to claim 5, wherein said saturated fatty acid modified hydroxyl-functionalized hyperbranched polyester has a molecular weight ranging from 2,500 to 5,000 g/mol.

22. A banknote carrying the ink according to claim 1.

23. Method for producing an ink according to claim 19, wherein the at least one derivative of a dendritic polymer is derived from 2,2-dimethylolpropionic acid.

* * * * *